D. D. GITT.
Horse Rake.
No. 45,920. Patented Jan. 17, 1865.
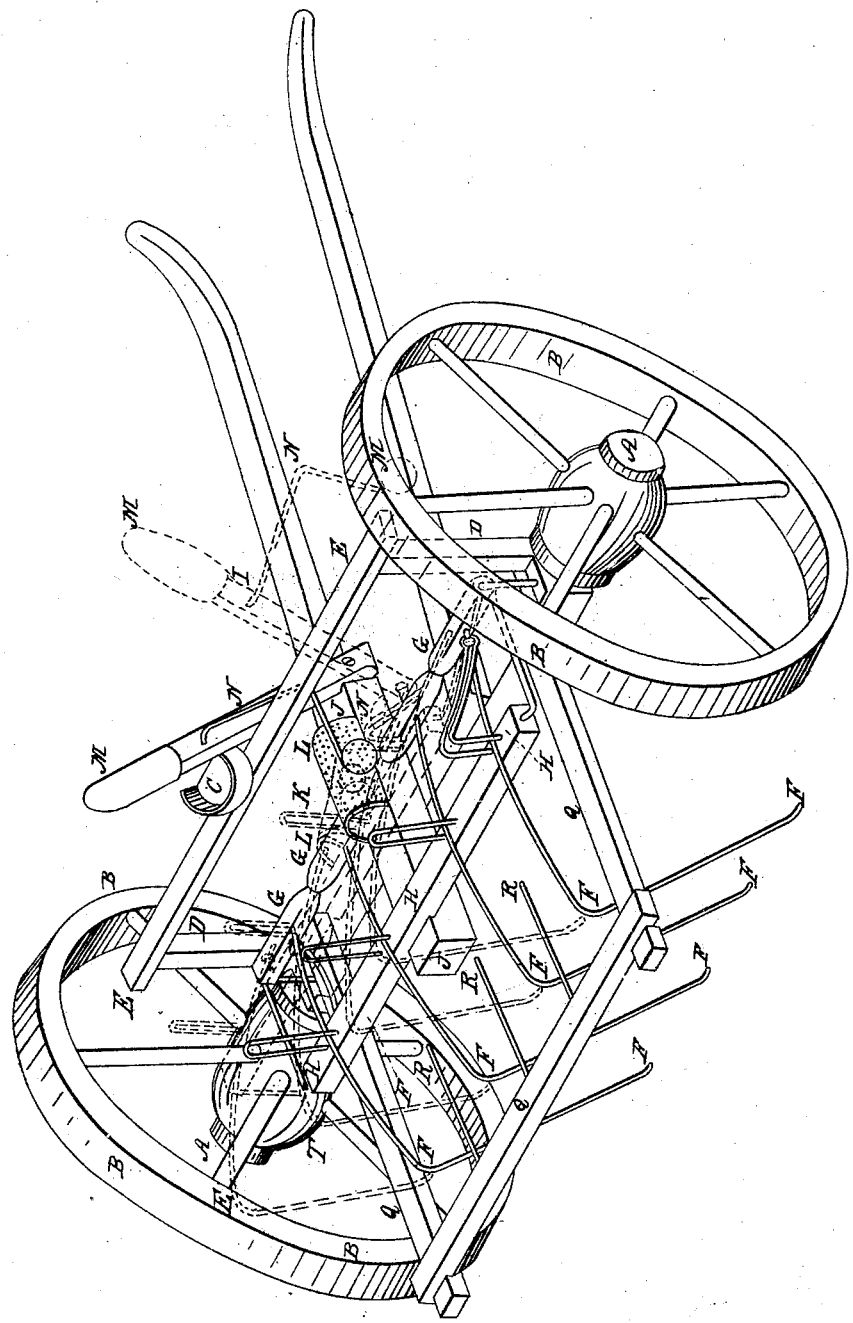

UNITED STATES PATENT OFFICE.

DANIEL D. GITT, OF ARENDTSVILLE, PENNSYLVANIA.

IMPROVEMENT IN HORSE-RAKES.

Specification forming part of Letters Patent No. 45,920, dated January 17, 1865.

*To all whom it may concern:*

Be it known that I, DANIEL D. GITT, of Arendtsville, in the county of Adams and State of Pennsylvania, have invented certain new and useful Improvements in Horse-Rakes; and I hereby declare that the following is a full, clear, and exact description of the same, reference being had to the accompanying drawing, which represents a perspective view of the same.

The object of the first part of my invention is to facilitate the discharge of the hay and to maintain the rake-teeth in their proper position when gathering without excess of deadweight.

To this effect the first part of my invention consists in the employment, in combination with any part of the rake which, for the purpose of discharging the rake, is moved or movable, of a weight under the arrangement hereinafter described, so that while the center of gravity of the rake proper is back of its fulcrum, it shall, on the rake being operated for discharge, be displaced and thrown forward in the manner hereinafter described.

The second part of my invention has for its object an improvement in the construction of spring rake-teeth, whereby the same may be made much lighter, cheaper, and more durable.

To this end the second part of my invention consists in combining with the teeth, made of wire or other material, hinged to or hung upon a fulcrum-bar, a spring-staple under the arrangement hereinafter described, so as to bear with yielding pressure on the teeth.

To enable others to make and use my invention, I shall now preceed to describe the construction and operation of my improved horse-rake.

Upon the axle A of the wheels B is established the raker's seat C. It consists of an upright, D, bolted or otherwise secured to the axle, at each end thereof, and of a traverse-beam, E, which unites and rests upon the tops of the said uprights. This traverse-beam should be sufficiently thin to allow of flexibility and springiness in the center, and so as to afford a yielding support to the seat. Heretofore the seat was attached to the axle directly. This arrangement rendered the seat hard and insecure, while the weight, coupled with the effects of the jars upon the axle, midway, or thereabout, between its points of support, caused the axle gradually to sag and finally to break. It will be seen that by the arrangement shown these evils are effectually remedied.

In a line parallel with the axle is arranged the horizontal hinge-bar E. It is secured to the axle by having its ends bent at right angles and by having the bent ends riveted or otherwise fastened to the axle. Upon this hinge-bar are mounted the spring rake-teeth F in the following manner: Each tooth, the upper part of which is slightly curved, and then suddenly bent so as to bring the lower part toward the ground in a straight or nearly straight line, is set in an independent hub, G, which is slipped onto the hinge-bar. The several teeth and hubs thus arranged in consecutive series are each capable of an up-and-down motion independently of each other. To maintain all the teeth in their proper positions either on or off the ground, they are supported by a traverse-bar, H, held at some distance in the rear of the hinge-bar by means of the rod I and the tilting or tipping beam J, the fulcrum of which is the hinge-bar before referred to. Upon this tilting beam I have arranged a weight, which is displaced according to the position of the supporting-beam. This weight is here shown to consist of a ball, K, free to roll within a cylindrical sleeve or housing. When the tipping beam is in the position indicated in black lines—that is, in condition to rake—then the ball is back of the hinge-bar by its weight tending to depress the traverse-bar. When, on the contrary, the rake is to be discharged and the beam made to occupy the position shown in red lines, then the ball is rolled forward, and it will by its weight tend to depress the forward end of the beam, and thus aid the operator in elevating the teeth for their discharge.

A modification of this arrangement consists in hanging a weight by means of a rod, N, hinged to the upper part of the lever, in such manner as to swing back and forth, according to the position of the lever, so that the said weight is thrown back of the hinge-bar when the lever is in position indicated in black lines, and thrown forward when in the position shown in red lines. The teeth are held to the ground by spring-pressure in a novel manner—that is to say, by an independent spring fast in the traverse-bar and bearing upon the rake-tooth. In the accompanying drawing I have shown two modes of carrying this into effect. The spring may be combined with a staple, as shown at O, which consists of an elongated staple bent backward, the loop end bearing on the rake-tooth. The spring may be independent of the staple, as shown at P, where an ordinary staple is used to limit the play of the rake-tooth, and a spring-staple is inserted in the rear of the traverse-bar whose exclusive function is to give the requisite amount of elasticity to the tooth.

In connection with the teeth I use a stationary clearer. It consists of a frame, Q, attached to the axle and surrounding the teeth. To the bar in the rear and parallel with the axle are attached spikes or wire rods R, projecting in the frame of the plane forward and between the teeth. This contrivance is stationary in relation to the axle, seat, &c., so that when the lifting or traverse bar is operated for the discharge of the rake-teeth the clearers will perform the functions of a comb and throw off the hay accumulated on the teeth.

Having thus fully described my invention and the manner in which the same is or may be carried into effect, I claim—

1. The employment, in combination with any part of the rake which, for the purpose of discharging the rake, is moved or movable, of a weight under the arrangement herein described, so that while the center of gravity of the lifting apparatus is back of its fulcrum, it shall, on the rake being operated for discharge, be displaced and thrown forward in the manner herein described.

2. Combining with the teeth, made of wire or other material, hinged to or hung upon a fulcrum-bar, a spring-staple under the arrangement herein described, so as to bear with yielding pressure on the teeth.

In testimony whereof I have signed my name to this specification before two subscribing witnesses.

DANL. D. GITT.

Witnesses:
A. POLLOK,
EDM. F. BROWN.